United States Patent
Sasabayashi et al.

(10) Patent No.: US 11,532,438 B2
(45) Date of Patent: Dec. 20, 2022

(54) MULTILAYER ELECTRONIC COMPONENT AND METHOD FOR MANUFACTURING MULTILAYER ELECTRONIC COMPONENT

(71) Applicant: Murata Manufacturing Co., Ltd., Nagaokakyo (JP)

(72) Inventors: Takehisa Sasabayashi, Nagaokakyo (JP); Kiyoshiro Ishibe, Nagaokakyo (JP); Kenji Ueno, Nagaokakyo (JP); Ai Fukumori, Nagaokakyo (JP); Akihiro Tsuru, Nagaokakyo (JP); Daisuke Hamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 141 days.

(21) Appl. No.: 16/930,350

(22) Filed: Jul. 16, 2020

(65) Prior Publication Data
US 2021/0020380 A1    Jan. 21, 2021

(30) Foreign Application Priority Data

Jul. 19, 2019    (JP) ............................. JP2019-134097

(51) Int. Cl.
*H01G 4/30* (2006.01)
*H01G 4/12* (2006.01)
(Continued)

(52) U.S. Cl.
CPC .............. *H01G 4/30* (2013.01); *H01G 4/012* (2013.01); *H01G 4/1227* (2013.01); *H01G 4/248* (2013.01)

(58) Field of Classification Search
CPC ........ H01G 4/012; H01G 4/1227; H01G 4/33; H01G 4/248; H01G 4/224; H01G 4/2325;
(Continued)

(56) References Cited

U.S. PATENT DOCUMENTS

2014/0211367 A1*  7/2014  Morita ..................... H01G 4/30
                                                                 361/301.4
2015/0155100 A1*  6/2015  Morita ................... H01G 4/012
                                                                 361/301.4
(Continued)

FOREIGN PATENT DOCUMENTS

CN         108231409 A         6/2018
DE      102010000783 A1 *      9/2010  ........... C04B 35/495
(Continued)

OTHER PUBLICATIONS

Official Communication issued in corresponding Korean Patent Application No. 10-2020-0083256, dated Dec. 20, 2021.
(Continued)

*Primary Examiner* — Michael P McFadden
(74) *Attorney, Agent, or Firm* — Keating & Bennett, LLP

(57)    ABSTRACT

A multilayer electronic component includes a multilayer body including dielectric layers and inner electrode layers. Each of the dielectric layers includes first crystal grains defining and functioning as plate-shaped objects that have an average thickness of less than or equal to about 300 nm and an average aspect ratio of more than or equal to about 5, each of the inner electrode layers includes second crystal grains defining and functioning as plate-shaped objects that have an average thickness of less than or equal to about 150 nm and an average aspect ratio of more than or equal to about 5, where an aspect ratio is represented by a ratio of a major axis of each plate-shaped object to a thickness of the plate-shaped object with the major axis of the plate-shaped object being orthogonal or substantially orthogonal to a thickness direction of the plate-shaped object.

17 Claims, 3 Drawing Sheets

(51) Int. Cl.
*H01G 4/248* (2006.01)
*H01G 4/012* (2006.01)

(58) Field of Classification Search
CPC ............ H01G 4/30; H01G 4/14; H01G 4/008; H01G 4/1236; H01G 4/1245
See application file for complete search history.

(56) References Cited

U.S. PATENT DOCUMENTS

| | | | |
|---|---|---|---|
| 2016/0039711 A1* | 2/2016 | Miyazaki | C03C 8/16 252/519.51 |
| 2016/0042867 A1* | 2/2016 | Kisumi | H01G 4/12 29/25.03 |
| 2016/0276102 A1* | 9/2016 | Suzuki | H01G 4/008 |
| 2017/0178811 A1* | 6/2017 | Chun | H01G 4/2325 |
| 2018/0182548 A1* | 6/2018 | Park | H01G 4/1218 |

FOREIGN PATENT DOCUMENTS

| | | |
|---|---|---|
| JP | 2004-084055 A | 3/2004 |
| JP | 2007-234330 A | 9/2007 |
| JP | 2008-266086 A | 11/2008 |
| JP | 2010-212503 A | 9/2010 |
| JP | 2011-091083 A | 5/2011 |

OTHER PUBLICATIONS

Official Communication issued in corresponding Chinese Patent Application No. 202010683573.4, dated Sep. 3, 2021.
Official Communication issued in corresponding Japanese Patent Application No. 2019-134097, dated Apr. 5, 2022.

* cited by examiner

MULTILAYER ELECTRONIC COMPONENT AND METHOD FOR MANUFACTURING MULTILAYER ELECTRONIC COMPONENT

CROSS REFERENCE TO RELATED APPLICATIONS

This application claims the benefit of priority to Japanese Patent Application No. 2019-134097 filed on Jul. 19, 2019. The entire contents of this application are hereby incorporated herein by reference.

BACKGROUND OF THE INVENTION

1. Field of the Invention

The present disclosure relates to a multilayer electronic component and a method for manufacturing the multilayer electronic component.

2. Description of the Related Art

In a multilayer electronic component such as a multilayer ceramic capacitor, capacitance is improved by a thin dielectric layer. In order to obtain a thin ceramic green sheet to define a dielectric layer, fine dielectric powder needs to be used. However, such fine dielectric powder is likely to be aggregated when formed into a slurry to produce a ceramic green sheet. Moreover, if sintering is performed without grain growth to obtain fine dielectric crystal grains, the dielectric constant is disadvantageously decreased.

In order to solve the above-described problem, Japanese Patent Laid-Open No. 2008-266086 discloses a technique for obtaining a thin ceramic green sheet using plate-shaped barium titanate particles.

A multilayer body included in a multilayer electronic component such as a multilayer ceramic capacitor includes dielectric layers and inner electrode layers. Each of the inner electrode layers has a lower sintering contraction starting temperature and a larger degree of contraction than those of each of the dielectric layers. Accordingly, when calcining the multilayer body, strains are generated in the multilayer body due to a difference in a sintering contraction state between the dielectric layer and the inner electrode layer. The strains may lead to generation of structural defects, such as delamination or cracks.

A ceramic green sheet using plate-shaped barium titanate particles undergoes sintering contraction in the thickness direction in a manner similar to a ceramic green sheet using fine barium titanate particles, but is less likely to undergo sintering contraction in a direction along a main surface thereof. Therefore, in a multilayer ceramic capacitor including the ceramic green sheet produced using the plate-shaped barium titanate particles, a difference in the sintering contraction state becomes large between the dielectric layer and the inner electrode layer during calcination. As a result, structural defects may be more likely to be generated in the multilayer body.

SUMMARY OF THE INVENTION

Preferred embodiments of the present invention provide multilayer electronic components and methods for manufacturing the multilayer electronic components that are each able to reduce or prevent generation of structural defects in a multilayer body.

A multilayer electronic component according to a preferred embodiment of the present invention includes a multilayer body including a plurality of laminated dielectric layers and a plurality of inner electrode layers. Each of the dielectric layers includes a plurality of first crystal grains defining and functioning as plate-shaped objects that have an average thickness of less than or equal to about 300 nm and an average aspect ratio of more than or equal to about 5, each of the inner electrode layers includes a plurality of second crystal grains defining and functioning as plate-shaped objects that have an average thickness of less than or equal to about 150 nm and an average aspect ratio of more than or equal to about 5, where an aspect ratio is represented by a ratio of a major axis of each plate-shaped object to a thickness of the plate-shaped object with the major axis of the plate-shaped object being orthogonal or substantially orthogonal to a thickness direction of the plate-shaped object.

A method for manufacturing a multilayer electronic component according to a preferred embodiment of the present invention includes obtaining a plurality of pre-sintering dielectric layers, forming pre-sintering inner electrode layers on pre-sintering dielectric layers of the plurality of pre-sintering dielectric layers, obtaining a pre-sintering multilayer body by laminating the plurality of pre-sintering dielectric layers including the pre-sintering dielectric layers on which the pre-sintering inner electrode layers are formed, and obtaining a multilayer body including a plurality of laminated dielectric layers and a plurality of inner electrode layers by sintering the pre-sintering multilayer body.

Where an aspect ratio is represented by a ratio of a major axis of each plate-shaped object to a thickness of the plate-shaped object with the major axis of the plate-shaped object being orthogonal or substantially orthogonal to a thickness direction of the plate-shaped object, in the obtaining of the plurality of pre-sintering dielectric layers, dielectric powder is used, the dielectric powder including dielectric particles defining as plate-shaped objects that have an average thickness of less than or equal to about 200 nm and that have an average aspect ratio of more than or equal to about 5. In the forming of the pre-sintering inner electrode layers, electrically conductive powder is used, the electrically conductive powder including electrically conductive particles defining and functioning as plate-shaped objects that have an average thickness of less than or equal to about 150 nm and that have an average aspect ratio of more than or equal to about 5.

With the multilayer electronic components according to preferred embodiments of the present invention, structural defects are able to be reduced or prevented from being generated in a multilayer body. Moreover, with the methods for manufacturing the multilayer electronic components according to preferred embodiments of the present invention, multilayer electronic components are able to be manufactured in each of which structural defects are reduced or prevented from being generated in a multilayer body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
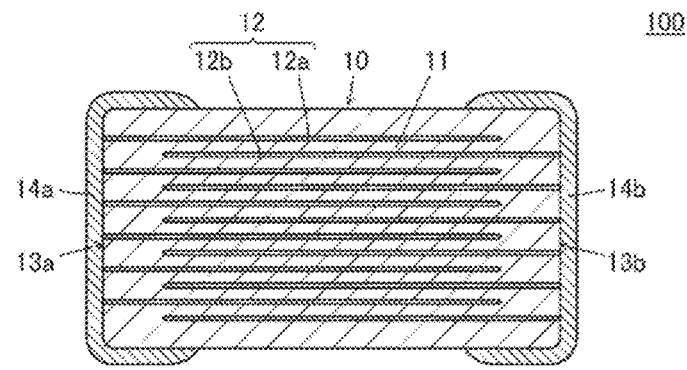
FIG. 1 is a cross sectional view of a multilayer ceramic capacitor 100 according to a preferred embodiment of the present invention at a central portion in a length direction.

Preferred embodiments of the present disclosure will be described with reference to figures. In preferred embodiments of multilayer electronic components, the same or common portions are denoted by the same reference characters in the figures and may not be described repeatedly.

Preferred Embodiment of Multilayer Electronic Component

Figure 2A:
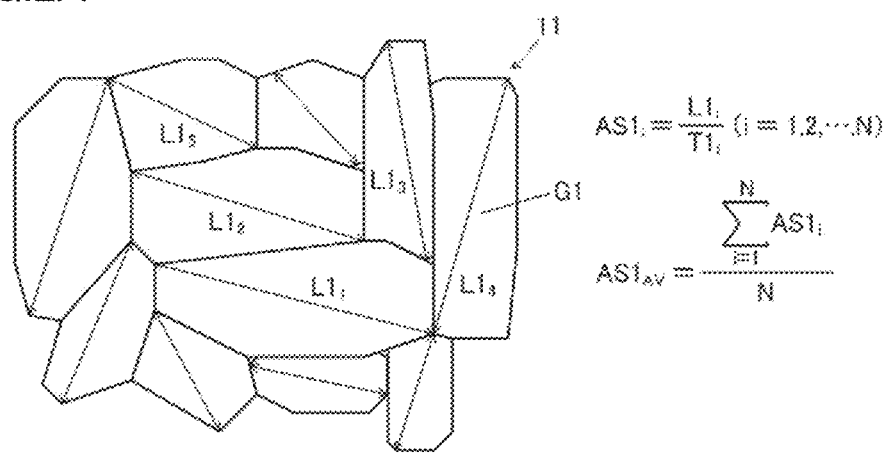
FIG. 2A is a top view of a dielectric layer 11 to illustrate a method for calculating an average aspect ratio $AS1_{AV}$ of first crystal grains G1 included in dielectric layer 11.
Figure 2B:
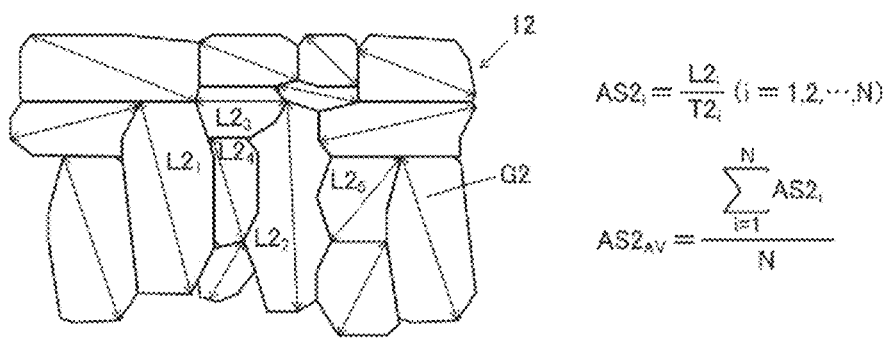
FIG. 2B is a top view of an inner electrode layer 12 to illustrate a method for calculating an average aspect ratio $AS2_{AV}$ of second crystal grains G2 included in inner electrode layer 12.
Figure 3:
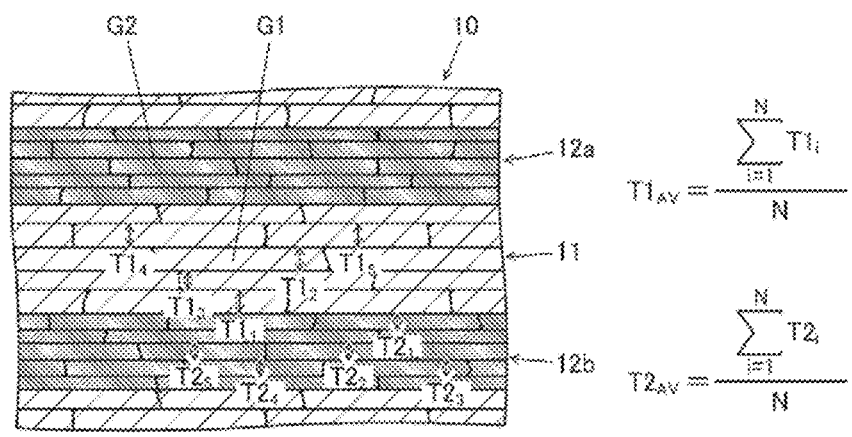
FIG. 3 is a cross sectional view schematically showing fine structures of dielectric layers 11 and inner electrode layers 12 in the vicinity of a central portion of a central region of a multilayer body 10 of multilayer ceramic capacitor 100 according to a preferred embodiment of the present invention.

With reference to FIG. 1 to FIG. 3, the following describes a multilayer ceramic capacitor 100 according to a preferred embodiment of the present invention.
Structure of Multilayer Ceramic Capacitor FIG. 1 is a cross sectional view of multilayer ceramic capacitor 100. Multilayer ceramic capacitor 100 includes a multilayer body 10. Multilayer body 10 includes a plurality of laminated dielectric layers 11 and a plurality of inner electrode layers 12. Moreover, multilayer body 10 includes first and second main surfaces facing each other in a lamination direction, first and second side surfaces facing each other in a width direction orthogonal or substantially orthogonal to the lamination direction, and first and second end surfaces 13a and 13b facing each other in a length direction orthogonal or substantially orthogonal to the lamination direction and the width direction.

Each of dielectric layers 11 includes a plurality of crystal grains including a perovskite compound including Ba and Ti, for example. The structure of each of these crystal grains will be described later. As the perovskite type compound, a perovskite compound including $BaTiO_3$ as its basic structure, for example, can preferably be used.

The plurality of inner electrode layers 12 include a first inner electrode layer 12a and a second inner electrode layer 12b. The structure of each of the crystal grains included in each inner electrode layer 12 will be described later. As a conductive material for inner electrode layer 12, it is possible to use, for example, at least one metal selected from Ni, a Ni alloy, Cu, and a Cu alloy, or an alloy including the metal. Inner electrode layer 12 may further include dielectric particles, which are referred to as "coexisting material". The coexisting material is added when calcining multilayer body 10 in order to provide inner electrode layer 12 with a sintering contraction characteristic close to that of dielectric layer 11. Any coexisting material may be used as long as such an advantageous effect is provided.

First inner electrode layer 12a includes a facing electrode portion facing second inner electrode layer 12b with dielectric layer 11 interposed therebetween, and a drawn electrode portion extending from the facing electrode portion to a first end surface 13a of multilayer body 10. Second inner electrode layer 12b includes a facing electrode portion facing first inner electrode layer 12a with dielectric layer 11 interposed therebetween, and a drawn electrode portion extending from the facing electrode portion to a second end surface 13b of multilayer body 10. One capacitor element is defined by one first inner electrode layer 12a and one second inner electrode layer 12b facing each other with dielectric layer 11 interposed therebetween.

Multilayer ceramic capacitor 100 further includes a first outer electrode 14a and a second outer electrode 14b. First outer electrode 14a is provided on first end surface 13a of multilayer body 10 so as to be electrically connected to first inner electrode layer 12a, and extends from first end surface 13a to the first and second main surfaces as well as the first and second side surfaces. Second outer electrode 14b is provided on second end surface 13b of multilayer body 10 so as to be electrically connected to second inner electrode layer 12b, and extends from second end surface 13b to the first and second main surfaces as well as the first and second side surfaces.

Multilayer ceramic capacitor 100 is configured such that the plurality of capacitor elements described above are connected in parallel via first outer electrode 14a and second outer electrode 14b.

Each of first outer electrode 14a and second outer electrode 14b includes an underlying electrode layer and a plating layer disposed on the underlying electrode layer. The underlying electrode layer includes at least one selected from a sintered body layer, a conductive resin layer, and a metal thin film layer, for example.

The sintered body layer is obtained by baking a paste including glass powder and metal powder, and includes a glass portion and a metal portion. Examples of glass for the glass portion include $B_2O_3$—$SiO_2$—BaO-based glass and the like. Examples of a metal for the metal portion can include at least one metal selected from Ni, Cu, Ag, and the like, or an alloy including the metal. A plurality of sintered body layers including different components may be provided. Moreover, in a non-limiting example of a manufacturing method described below, the sintered body layer may be calcined together with multilayer body 10, or may be baked after multilayer body 10 is calcined.

For example, the conductive resin layer includes conductive particles such as metal fine particles, and a resin portion. Examples of a metal for the conductive particles can include at least one metal selected from Ni, Cu, Ag, and the like, or an alloy including the metal. Examples of a resin for the resin portion can include an epoxy-based thermosetting resin and the like. A plurality of conductive resin layers having different components may be provided.

The metal thin film layer is formed by a thin film forming method such as sputtering or vapor deposition, for example.

The metal thin film layer preferably has a thickness of less than or equal to about 1 µm, for example, and includes the metal fine particles deposited therein. Examples of a metal for the metal thin film layer can include at least one metal selected from Ni, Cu, Ag, Au, and the like, or an alloy including the metal. A plurality of metal thin film layers having different components may be provided.

Examples of a metal for the plating layer can include at least one metal selected from Ni, Cu, Ag, Au, Sn, and the like, and an alloy including the metal. A plurality of plating layers having different components may be provided. Preferably, two plating layers, i.e., a Ni plating layer and a Sn plating layer, for example, are provided. The Ni plating layer can prevent the underlying electrode layer from being eroded by a solder when mounting the multilayer electronic component. The Sn plating layer has excellent wettability with respect to a solder including Sn. Accordingly, mountability can be improved when mounting the multilayer electronic component.

It should be noted that each of first outer electrode 14a and second outer electrode 14b may be a plating layer that is directly provided on multilayer body 10 and that is directly connected to a corresponding inner electrode layer. The plating layer preferably includes a first plating layer and a second plating layer provided on the first plating layer.

Examples of a metal for each of the first plating layer and the second plating layer can include at least one metal selected from Cu, Ni, Sn, Au, Ag, Pd, Zn, and the like, or an alloy including the metal. For example, when Ni is used as the metal for inner electrode layer 12, Cu, which has excellent bondability with respect to Ni, is preferably used as the first plating layer. When Sn or Au is used, the metal for the first plating layer preferably has a solder barrier characteristic. Moreover, as the metal for the second plating layer, it is preferable to use Ni, which has excellent solder wettability.

Fine Structures of Dielectric Layers and Inner Electrode Layers

Each of the dielectric layers 11 of multilayer body 10 included in multilayer ceramic capacitor 100 includes a plurality of first crystal grains G1 (see FIG. 2A; described later) defining and functioning as plate-shaped objects that preferably have an average thickness of less than or equal to about 300 nm and that preferably have an average aspect ratio of more than or equal to about 5, for example. Here, the aspect ratio refers to a ratio of a major axis of each plate-shaped object to a thickness of the plate-shaped object, the major axis being orthogonal or substantially orthogonal to a thickness direction of the plate-shaped object. First crystal grains G1 are each composed of a dielectric material. Each of inner electrode layers 12 includes a plurality of second crystal grains G2 (see FIG. 2B; described later) defining and functioning as plate-shaped objects that preferably have an average thickness of less than or equal to about 150 nm and that preferably have an average aspect ratio of more than or equal to about 5, for example. Second crystal grains G2 are each composed of an electrically conductive material.

In order to examine fine structures of dielectric layers 11 and inner electrode layers 12, observation was performed using a scanning electron microscope (hereinafter, simply referred to as "SEM"). In this examination, for the materials of dielectric layers 11, dielectric materials that had $BaTiO_3$ as the basic structure of the perovskite compound and that had various additives added therein were used. Moreover, Ni was used for the material of inner electrode layer 12.

The following describes a non-limiting example of a method for examining the fine structures of dielectric layers 11 and inner electrode layers 12 in multilayer body 10 of multilayer ceramic capacitor 100 with reference to FIGS. 2A and 2B.

By a manufacturing method described below, multilayer body 10 of multilayer ceramic capacitor 100 was obtained. Multilayer body 10 was hypothetically divided into the following three regions in the lamination direction: an upper region, a central region, and a lower region. Then, dielectric layer 11 and inner electrode layer 12 in the vicinity of the central portion of each region in the lamination direction, width direction, and length direction were exposed. Respective exposed surfaces were subjected to SEM observation.

FIG. 2A is a top view of dielectric layer 11 to illustrate a method for calculating an average aspect ratio $AS1_{AV}$ (described later) of first crystal grains G1 included in dielectric layer 11. From each of the three regions, i.e., the upper region, the central region, and the lower region, three exposed surfaces of dielectric layer 11 were obtained. Each of the exposed surfaces of dielectric layer 11 can be obtained by dissolving inner electrode layer 12 and then dividing multilayer body 10 at a desired position.

In the exposed surface of dielectric layer 11, first crystal grains G1 were observed, which are a plurality of plate-shaped objects as shown in FIG. 2A. Major axes $L1_i$ (i=1, 2, . . . N) of first crystal grains G1 in the SEM observation image were measured. Major axes $L1_i$ were measured by image analysis. Moreover, first crystal grains G1 having major axes $L1_i$ measured were processed using focused ion beam (hereinafter, simply referred to as "FIB") so as to recognize the thicknesses thereof. Thicknesses $T1_i$ (i=1, 2, . . . N) were measured by SEM.

It should be noted that each thickness $T1_i$ was an average of measurements at three portions in the cross section of first crystal grain G1 exposed by the FIB processing. The number N of measured grains in the examination for the fine structure of dielectric layer 11 herein was 20.

Here, it is assumed that an aspect ratio $AS1_i$ is represented by a ratio of a major axis $L1_i$ of first crystal grain G1 defining and functioning as a plate-shaped object to a thickness $T1_i$ of first crystal grain G1. Major axis $L1_i$ is orthogonal or substantially orthogonal to the direction of thickness $T1_i$. $AS1_1, AS1_2, \ldots, AS1_{20}$ were calculated based on major axes $L1_1, L1_2, \ldots, L1_{20}$ and thicknesses $T1_1, T1_2, \ldots, T1_{20}$, which were obtained by the above-described measurements. An average aspect ratio $AS1_{AV}$ was calculated, which is an average value of those aspect ratios $AS1_1, AS1_2, \ldots, AS1_{20}$. Moreover, an average thickness $T1_{AV}$ of thicknesses $T1_1, T1_2, \ldots, T1_{20}$ was calculated.

This operation was performed for a total of nine exposed surfaces of dielectric layer 11. The nine exposed surfaces included three exposed surfaces obtained from the upper region, three exposed surfaces obtained from the central region, and three exposed surfaces obtained from the lower region. As a result, it was confirmed that average aspect ratio $AS1_{AV}$ of first crystal grains G1 was more than or equal to about 5 in each of the exposed surfaces of dielectric layer 11. Moreover, it was confirmed that average thickness $T1_{AV}$ of first crystal grains G1 was about 300 nm.

FIG. 2B is a top view of inner electrode layer 12 to illustrate a method for calculating an average aspect ratio $AS2_{AV}$ (described later) of second crystal grains G2 included in inner electrode layer 12. From each of the three regions, i.e., the upper region, the central region, and the lower region, three exposed surfaces of inner electrode layer 12 were obtained. Each of the exposed surfaces of inner electrode layer 12 can be obtained by electrochemically or mechanically detaching dielectric layer 11 and inner electrode layer 12 from each other at an interface therebetween.

In the exposed surface of inner electrode layer 12, second crystal grains G2 were observed, which are a plurality of plate-shaped objects as shown in FIG. 2B. Major axes $L2_i$ (i=1, 2, . . . N) of second crystal grains G2 in the SEM observation image were measured. Major axes $L2_i$ were measured by image analysis. Moreover, second crystal grains G2 having major axes $L2_i$ measured were processed using FIB so as to recognize the thicknesses thereof. Thicknesses $T2_i$ (i=1, 2, . . . N) were measured by SEM.

It should be noted that each thickness $T2_i$ was an average of measurements at three portions in the cross section of second crystal grain G2 exposed by the FIB processing. The number N of measured grains in the examination for the fine structure of inner electrode layer 12 herein was 20.

Here, it is assumed that an aspect ratio $AS2_i$ is represented by a ratio of a major axis $L2_i$ of second crystal grain G2 defining as a plate-shaped object to a thickness $T2_i$ of second crystal grain G2. Major axis $L1_i$ is orthogonal or substantially orthogonal to the direction of thickness $T2_i$. $AS2_1$, $AS2_2$, . . . , $AS2_{20}$ were calculated based on major axes $L2_1$, $L2_2$, . . . , $L2_{20}$ and thicknesses $T2_1$, $T2_2$, . . . , $T2_{20}$, which were obtained by the above-described measurements. An average aspect ratio $AS2_{AV}$ was calculated, which was an average value of those aspect ratios $AS2_1, AS2_2, \ldots, AS2_{20}$. Moreover, an average thickness $T2_{AV}$ of thicknesses $T2_1$, $T2_2$, . . . , $T2_{20}$ was calculated.

This operation was performed for a total of nine exposed surfaces of inner electrode layer 12. The nine exposed surfaces included three exposed surfaces obtained from the upper region, three exposed surfaces obtained from the central region, and three exposed surfaces obtained from the lower region. As a result, it was confirmed that average aspect ratio $AS2_{AV}$ of second crystal grains G2 was more than or equal to about 5 in each of the exposed surfaces of inner electrode layer 12. Moreover, it was confirmed that average thickness $T2_{AV}$ of second crystal grains G2 was about 150 nm.

FIG. 3 is a cross sectional view schematically showing fine structures of dielectric layers 11 and inner electrode layers 12 in the vicinity of the central portion of the central region of multilayer body 10 of multilayer ceramic capacitor 100 shown in FIG. 1. The same applies to the cases of the upper region and the lower region, and therefore explanation therefor is omitted.

As described above, each of dielectric layers 11 of multilayer body 10 of multilayer ceramic capacitor 100 includes first crystal grains G1 that have an average thickness $T1_{AV}$ of less than or equal to about 300 nm and that have an average aspect ratio $AS1_{AV}$ of more than or equal to about 5, for example. Moreover, each of first inner electrode layer 12a and second inner electrode layer 12b includes second crystal grains G2 that have an average thickness $T2_{AV}$ of less than or equal to 150 nm and that have an average aspect ratio $AS2_{AV}$ of more than or equal to about 5, for example.

In multilayer ceramic capacitor 100, inner electrode layer 12 includes second crystal grains G2 defining and functioning as the plate-shaped objects. Therefore, a degree of sintering contraction in the direction along the first and second main surfaces of multilayer body 10 is smaller than that in the case where the inner electrode layer includes no electrically conductive particles defining and functioning as the plate-shaped objects. Thus, when combined with dielectric layer 11 including first crystal grains G1 defining and functioning as the plate-shaped objects and having a small degree of sintering contraction, strains can be reduced or prevented from being generated in multilayer body 10 due to a difference in sintering contraction state between dielectric layer 11 and inner electrode layer 12. That is, structural defects, such as delamination and cracks resulting from the strains, can be reduced or prevented from being generated.

It should be noted that when dielectric layer 11 is a thin layer having an average thickness of less than or equal to about 0.4 μm, the capacitance of multilayer ceramic capacitor 100 can be improved in addition to the above-described advantageous effects. In this case, however, in a separate experiment, it was confirmed that a force of deforming the dielectric layer due to sintering contraction of the inner electrode layer becomes larger than that in the case where dielectric layer 11 has an average thickness of more than about 0.4 μm. Even in such a case, strains can be effectively reduced or prevented from being generated in multilayer body 10, by combining dielectric layer 11 including first crystal grains G1 and inner electrode layer 12 including second crystal grains G2, both of which have the above-described features.

Moreover, in addition to the above-described advantageous effects, when the average thickness of inner electrode layer 12 is less than or equal to about 0.3 μm, for example, the thickness of multilayer body 10 in the lamination direction can be reduced. In this case, however, pores are more likely to be formed in the inner electrode layer due to sintering contraction than in the case where inner electrode layer 12 has an average thickness of more than about 0.3 μm, with the result that the inner electrode layer may have a mesh structure in an extreme case. Even in such a case, in addition to the advantageous effects described above, pores in the inner electrode layer can be reduced by combining dielectric layer 11 including first crystal grains G1 and inner electrode layer 12 including second crystal grains G2, both of which have the above-described features. As a result, the capacitance of multilayer ceramic capacitor 100 can be reduced or prevented from being decreased.

Method for Manufacturing Multilayer Ceramic Capacitor

A method for manufacturing multilayer ceramic capacitor 100 according to a preferred embodiment of the present invention will be described in order of manufacturing steps. The method for manufacturing multilayer ceramic capacitor 100 includes the following steps.

The method for manufacturing multilayer ceramic capacitor 100 includes a step of obtaining a plurality of ceramic green sheets using powder (dielectric powder) obtained by providing various additives onto surfaces of $BaTiO_3$ powder, for example. This step corresponds to the step of obtaining a plurality of pre-sintering dielectric layers. That is, the word "green" is used to express "pre-sintering".

The dielectric powder can be prepared by, for example, providing organic compounds as the additives onto the surfaces of the $BaTiO_3$ powder and performing calcination to burn organic components so as to obtain a state in which the additives are provided on the surfaces of the $BaTiO_3$ powder as oxides. However, it is not limited thereto. The additives may be provided as organic compounds or in a mixture of oxides and organic compounds. Moreover, $BaTiO_3$ solid solution powder may be used instead of the $BaTiO_3$ powder.

It should be noted that each of the ceramic green sheets can be obtained by a known method to apply, to a substrate, a slurry including the dielectric powder and a binder. Examples of the known method include a doctor blade method, applying methods using various coaters, or the like.

The method for manufacturing multilayer ceramic capacitor 100 includes a step of printing inner electrode layer patterns onto the ceramic green sheets using an inner electrode paste including electrically conductive powder. This step corresponds to the step of forming pre-sintering inner electrode layers on pre-sintering dielectric layers of the plurality of pre-sintering dielectric layers. For example, the inner electrode paste may preferably include electrically conductive powder including one of Ni, a Ni alloy, Cu, and a Cu alloy, and powder (coexisting material) obtained by applying the various additives onto the surfaces of the $BaTiO_3$ powder. It should be noted that the coexisting material is not required.

The above-described coexisting material can be prepared by, for example, providing organic compounds as the additives onto the surfaces of the $BaTiO_3$ powder and performing calcination to burn organic components to obtain a state in which the additives are provided on the surfaces of the $BaTiO_3$ powder as oxides. However, it is not limited thereto. The additives may be provided as organic compounds or in a mixture of oxides and organic compounds. Moreover, $BaTiO_3$ solid solution powder may be used instead of the $BaTiO_3$ powder. The coexisting material may be the same as or different from the dielectric powder.

The method for manufacturing multilayer ceramic capacitor 100 includes a step of obtaining a green multilayer body by laminating a plurality of ceramic green sheets including the ceramic green sheets including the inner electrode patterns formed thereon. This step corresponds to the step of obtaining a pre-sintering multilayer body by laminating the plurality of pre-sintering dielectric layers including the pre-sintering dielectric layers on which the pre-sintering inner electrode layers are formed.

The method for manufacturing multilayer ceramic capacitor 100 includes a step of obtaining a multilayer body including a plurality of laminated dielectric layers and a plurality of inner electrode layers by sintering the green multilayer body. This step corresponds to the step of obtaining a multilayer body including a plurality of laminated dielectric layers and a plurality of inner electrode layers by sintering the pre-sintering multilayer body.

Here, in the step of obtaining the plurality of ceramic green sheets, dielectric powder is used. The dielectric powder includes dielectric particles defining and functioning as plate-shaped objects. The dielectric particles preferably have an average thickness of less than or equal to about 200 nm and have an average aspect ratio of more than or equal to about 5, for example. The dielectric powder is mixed with the binder as described above and is formed into a slurry, which is then applied onto substrates, thus obtaining the ceramic green sheets.

Moreover, in the step of printing the inner electrode layer patterns onto the ceramic green sheets using the inner electrode paste including the electrically conductive powder, electrically conductive powder is used. The electrically conductive powder includes electrically conductive particles defining and functioning as the plate-shaped objects. The electrically conductive particles preferably have an average thickness of less than or equal to about 150 nm and have an average aspect ratio of more than or equal to about 5, for example. The electrically conductive powder is mixed with a binder and is formed into a paste, thus obtaining the inner electrode paste. It should be noted that the aspect ratio is defined in the description of the fine structures of the dielectric layers and the inner electrode layers.

By using the dielectric powder including the dielectric particles and the electrically conductive powder including the electrically conductive particles, both of which have the above-described features, multilayer ceramic capacitor 100 having the above-described features can be manufactured.

The following describes the steps from the step of obtaining the ceramic green sheets to the step of obtaining the sintered multilayer body, with reference to FIGS. 4A to 4D.

Each of FIGS. 4A to 4D is a cross sectional view showing a major portion of the process for manufacturing multilayer body included in multilayer ceramic capacitor 100 according to a preferred embodiment of the present invention.

Figure 4A:
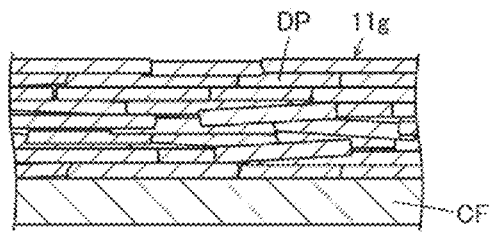
FIG. 4A is a cross sectional view showing a step of obtaining a ceramic green sheet 11g.

FIG. 4A is a cross sectional view showing the step of obtaining a ceramic green sheet 11g. For producing ceramic green sheet 11g, dielectric powder is used. The dielectric powder includes dielectric particles DP defining and functioning as plate-shaped objects that preferably have an average thickness of less than or equal to about 200 nm and that have an average aspect ratio of more than or equal to about 5, for example. The dielectric powder includes a perovskite compound including Ba and Ti, such as, for example, $BaTiO_3$ or a $BaTiO_3$ solid solution. As described above, the dielectric powder and the binder are formed into a slurry, which is then applied onto a substrate CF such as a resin film, for example, thus obtaining ceramic green sheet 11g. The binder is not shown in the figure.

Figure 4B:
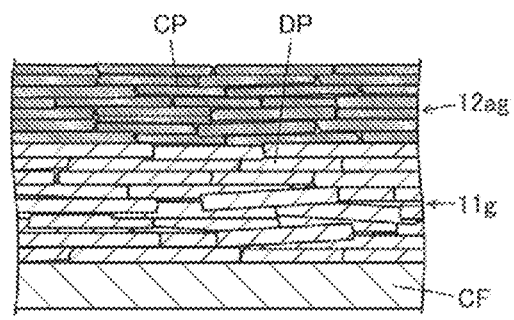
FIG. 4B is a cross sectional view showing a step of providing a first inner electrode layer pattern 12ag on ceramic green sheet 11g.

FIG. 4B is a cross sectional view showing the step of providing a first inner electrode layer pattern 12ag on ceramic green sheet 11g. It should be noted that the step of providing second inner electrode layer pattern 12bg (see FIG. 4C) on ceramic green sheet 11g is the same or substantially the same as the step of providing first inner electrode layer pattern 12ag thereon, and is therefore not described here.

For producing first inner electrode layer pattern 12ag, electrically conductive powder is used. The electrically conductive powder includes electrically conductive particles CP defining and functioning as plate-shaped objects that preferably have an average thickness of less than or equal to about 150 nm and an average aspect ratio of more than or equal to about 5, for example. The electrically conductive powder preferably includes Ni, for example. As described above, the electrically conductive powder and the binder are formed into a paste, which is then applied onto ceramic green sheet 11g in the form of a predetermined pattern. The binder is not shown in the figure.

Figure 4C:
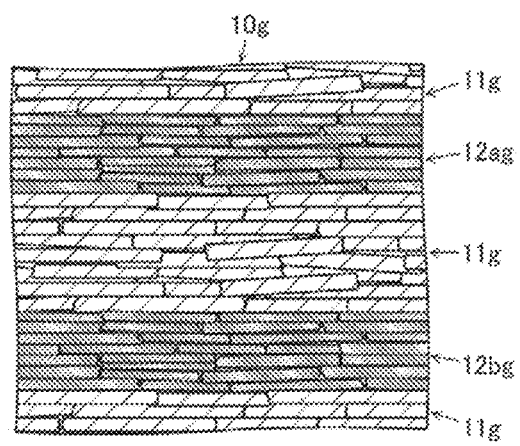
FIG. 4C is a cross sectional view showing a step of obtaining a green multilayer body 10g by laminating a plurality of ceramic green sheets 11g including ceramic green sheets 11g each including the inner electrode layer pattern.

FIG. 4C is a cross sectional view showing a step of obtaining a green multilayer body 10g by laminating a plurality of ceramic green sheets 11g including ceramic green sheets 11g including the inner electrode layer patterns. First inner electrode layer pattern 12ag and second inner electrode layer pattern 12bg are disposed to form a capacitor element when multilayer ceramic capacitor 100 is formed. Green multilayer body 10g is formed by a known method. It should be noted that during the formation of green multilayer body 10g, hydrostatic pressing, for example, may be performed. In this case, the dielectric particles and electrically conductive particles, both of which define and function as the plate-shaped objects, are oriented effectively.

Figure 4D:
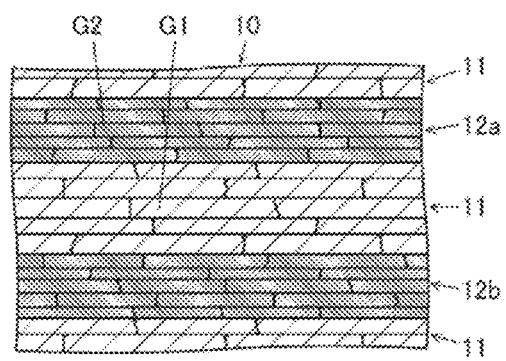
FIG. 4D is a cross sectional view showing a step of obtaining a multilayer body including a plurality of laminated dielectric layers 11 and a plurality of first and second inner electrode layers 12a and 12b by sintering green multilayer body 10g.

FIG. 4D is a cross sectional view showing the step of obtaining the multilayer body including the plurality of laminated dielectric layers 11 and the plurality of first and second inner electrode layers 12a and 12b by sintering green multilayer body 10g. First inner electrode layer 12a includes the plurality of first crystal grains G1 defining and functioning as the plate-shaped objects that preferably have an average thickness of less than or equal to about 300 nm and that have an average aspect ratio of more than or equal to about 5, for example. Moreover, each of first inner electrode layer 12a and second inner electrode layer 12b includes the plurality of second crystal grains G2 defining and functioning as the plate-shaped objects that preferably have an average thickness of less than or equal to about 150 nm and that have an average aspect ratio of more than or equal to about 5, for example.

Ceramic green sheet 11g has a small degree of contraction during sintering. Thus, when combined with first inner electrode layer pattern 12ag and second inner electrode layer pattern 12bg each of which similarly has a smaller degree of contraction during sintering than that in the case where no electrically conductive particles defining and functioning as the plate-shaped objects are included, strains can be reduced or prevented from being generated in multilayer body 10 after the sintering. Further, structural defects, such as delamination and cracks resulting from the strains, can be reduced or prevented from being generated.

It should be noted that in addition to the reduction or prevention of the generation of the structural defects, when the average thickness of the dielectric particles defining and functioning as the plate-shaped objects and included in the dielectric powder is less than or equal to about 100 nm, the number of first crystal grains G1 overlapping in the thickness direction can be increased in dielectric layer 11 having been calcined. Moreover, as shown in FIG. 3, first crystal grains G1 partially overlap with one another to obtain a long path from first inner electrode layer 12a to second inner electrode layer 12b along grain boundaries of dielectric layer 11. In this case, insulation resistance and reliability can be improved.

Moreover, in addition to the reduction or prevention of the generation of the structural defects, when the average thickness of the electrically conductive particles defining and functioning as the plate-shaped objects and included in the electrically conductive powder is less than or equal to about 50 nm, the number of second crystal grains G2 overlapping in the thickness direction can be increased in inner electrode layer 12 having been calcined. Moreover, as shown in FIG. 3, second crystal grains G2 partially overlaps with one another to obtain a long path from one main surface to the other main surface along the grain boundaries of inner electrode layer 12. In this case, pores formed in the inner electrode layer due to sintering contraction can be reduced.

The preferred embodiments of the present disclosure are illustrative and the present invention is not limited to the preferred embodiments described above. The scope of the present invention is defined by the terms of the claims, and is intended to include any modifications within the scope and meaning equivalent to the terms of the claims. Moreover, various applications and modifications can be made within the above-described scope.

For example, various applications and modifications can be made within the scope of the present invention with regard to the number of the dielectric layers, the material of each dielectric layer, the number of the inner electrode layers, and the material of each inner electrode layer in the multilayer body. Moreover, although the multilayer ceramic capacitor has been illustrated as an example of a multilayer electronic component, the present invention is not limited thereto, and is applicable to, for example, a capacitor element or the like included or formed in a multilayer substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer electronic component comprising:
a multilayer body including a plurality of laminated dielectric layers and a plurality of inner electrode layers; wherein
each of the plurality of dielectric layers includes a plurality of first crystal grains defining and functioning as plate-shaped objects that have an average thickness of less than or equal to about 300 nm and an average aspect ratio of more than or equal to about 5;
each of the plurality of inner electrode layers includes a plurality of second crystal grains defining and functioning as plate-shaped objects that have an average thickness of less than or equal to about 150 nm and an average aspect ratio of more than or equal to about 5;
where the aspect ratio is represented by a ratio of a major axis of each of the plate-shaped objects to a thickness of each of the plate-shaped objects, the major axis of the plate-shaped objects being orthogonal or substantially orthogonal to a thickness direction of the plate-shaped objects;
the plurality of first crystal grains partially overlap with one another to obtain a long path from a first inner electrode layer of the plurality of inner electrode layers to a second inner electrode layer of the plurality of inner electrode layers along grain boundaries of a dielectric layer of the plurality of dielectric layers that is interposed between the first inner electrode layer and the second inner electrode layer; and
the plurality of second crystal grains partially overlap with one another to obtain a long path from one main surface to another main surface along grain boundaries of each of the plurality of inner electrode layers.

2. The multilayer electronic component according to claim 1, wherein each of the plurality of dielectric layers has an average thickness of less than or equal to about 0.4 μm.

3. The multilayer electronic component according to claim 1, wherein each of the plurality of inner electrode layers has an average thickness of less than or equal to about 0.3 μm.

4. The multilayer electronic component according to claim 1, wherein the plurality of first crystal grains include a perovskite compound including Ba and Ti.

5. The multilayer electronic component according to claim 1, wherein the plurality inner electrode layers are made of at least one of Ni, a Ni alloy, Cu, and a Cu alloy.

6. The multilayer electronic component according to claim 1, further comprising first and second outer electrodes respectively provided on end surfaces of the multilayer body.

7. The multilayer electronic component according to claim 6, wherein each of the first and second outer electrodes include an underlying electrode layer and a plating layer disposed on the underlying layer.

8. The multilayer electronic component according to claim 7, wherein the underlying electrode layer includes at least one of a sintered body, a conductive resin layer, and a metal thin film layer.

9. The multilayer electronic component according to claim 7, wherein the underlying electrode layer includes a glass portion and a metal portion.

10. The multilayer electronic component according to claim 9, wherein the glass portion includes $B_2O_3$—$SiO_2$—BaO-based glass.

11. The multilayer electronic component according to claim 9, wherein the metal portion includes at least one of Ni, Cu, and Ag.

12. The multilayer electronic component according to claim 7, wherein the plating layer includes at least one of Ni, Cu, Ag, Au, and Sn.

13. The multilayer electronic component according to claim 7, wherein the plating layer includes a Ni plating layer and a Sn plating layer disposed on the Ni plating layer.

14. A method for manufacturing a multilayer electronic component, the method comprising: obtaining a plurality of pre-sintering dielectric layers; forming pre-sintering inner electrode layers on pre-sintering dielectric layers of the plurality of pre-sintering dielectric layers; obtaining a pre-sintering multilayer body by laminating the plurality of pre-sintering dielectric layers including the pre-sintering dielectric layers on which the pre-sintering inner electrode layers are formed; and obtaining a multilayer body including a plurality of laminated dielectric layers and a plurality of inner electrode layers by sintering the pre-sintering multilayer body; wherein in the obtaining of the plurality of pre-sintering dielectric layers, dielectric powder is used, the dielectric powder including a plurality of first crystal grains defining and functioning as plate-shaped objects that have an average thickness of less than or equal to about 200 nm and an average aspect ratio of more than or equal to about 5; in the forming of the pre-sintering inner electrode layers, electrically conductive powder is used, the electrically conductive powder including a plurality of second crystal grains defining and functioning as plate-shaped objects that have an average thickness of less than or equal to about 150 nm and an average aspect ratio of more than or equal to about 5; where the aspect ratio is represented by a ratio of a major axis of each of the plate-shaped objects to a thickness of each of the plate-shaped objects, the major axis of the plate-shaped objects being orthogonal or substantially orthogonal to a thickness direction of the plate-shaped objects the plurality of first crystal grains partially overlap with one another to obtain a long path from a first inner electrode layer of the plurality of inner electrode layers to a second inner electrode layer of the plurality of inner electrode layers along grain boundaries of a dielectric layer of the plurality of dielectric layers that is interposed between the first inner electrode layer and the second inner electrode layer; and the plurality of second crystal grains partially overlap with one another to obtain a long path from one main surface to another main surface along grain boundaries of each of the plurality of inner electrode layers.

15. The method for manufacturing the multilayer electronic component according to claim 14, wherein
the dielectric powder includes a perovskite compound including Ba and Ti; and
the electrically conductive powder includes Ni.

16. The method for manufacturing the multilayer electronic component according to claim 14, wherein the plurality of first crystal grains defining and functioning as the plate-shaped objects included in the dielectric powder have an average thickness of less than or equal to about 100 nm.

17. The method for manufacturing the multilayer electronic component according to claim 14, wherein the plurality of second crystal grains defining and functioning as the plate-shaped objects included in the electrically conductive powder have an average thickness of less than or equal to about 50 nm.

* * * * *